United States Patent
Koudar et al.

(10) Patent No.: US 9,810,778 B2
(45) Date of Patent: Nov. 7, 2017

(54) TRIGGERED-EVENT SIGNALING WITH DIGITAL ERROR REPORTING

(71) Applicant: SEMICONDUCTOR COMPONENTS INDUSTRIES, LLC, Phoenix, AZ (US)

(72) Inventors: Ivan Koudar, Modrice (CZ); Tomas Suchy, Brno (CZ); Marek Hustava, Bratislava (SK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 102 days.

(21) Appl. No.: 14/853,307

(22) Filed: Sep. 14, 2015

(65) Prior Publication Data
US 2017/0074977 A1    Mar. 16, 2017

(51) Int. Cl.
| | |
|---|---|
| G06F 19/00 | (2011.01) |
| G06F 11/07 | (2006.01) |
| G06F 11/30 | (2006.01) |
| G01S 7/52 | (2006.01) |
| G01S 15/93 | (2006.01) |
| G01S 15/87 | (2006.01) |

(52) U.S. Cl.
CPC .......... *G01S 7/52004* (2013.01); *G01S 15/87* (2013.01); *G01S 15/931* (2013.01); *G01S 2015/932* (2013.01); *G01S 2015/938* (2013.01)

(58) Field of Classification Search
CPC .... G01S 7/52004; G01S 15/87; G01S 15/931; G01S 15/932; G01S 2015/938

USPC .......................................................... 702/116
See application file for complete search history.

(56) References Cited

U.S. PATENT DOCUMENTS

| | | | | |
|---|---|---|---|---|
| 5,991,693 | A * | 11/1999 | Zalewski | G09B 5/065 345/156 |
| 7,248,153 | B2 | 7/2007 | Danz et al. | |
| 7,385,487 | B2 | 6/2008 | Simonazzi | |
| 2003/0083839 | A1* | 5/2003 | Boswell | G01R 31/002 702/117 |
| 2007/0159710 | A1* | 7/2007 | Lucas | G11B 19/043 360/75 |
| 2010/0064809 | A1* | 3/2010 | Toga | G11B 19/042 73/514.34 |
| 2014/0120966 | A1* | 5/2014 | Fischer | H04K 3/822 455/500 |

(Continued)

*Primary Examiner* — Ly D Pham
(74) *Attorney, Agent, or Firm* — Iselin Law, PLLC

(57) ABSTRACT

An illustrative sensor controller embodiment includes: a transmitter that drives an ultrasonic transducer to produce a transmit pulse; a receiver that derives a sensor signal from the transducer; and a core logic that detects a trigger signal on an event signaling line and responsively provides one or more error reporting bits on the event signaling line before driving the event signaling line based on the sensor signal. An illustrative embodiment of a sensor control method includes: detecting a trigger signal on an event signaling line; providing at least one status bit on the event signaling line in response to the trigger signal; and after providing the at least one status bit, driving the event signaling line based upon on a sensor signal from a transducer. The transducer may be a piezoelectric element for producing and sensing ultrasonic pulses, particularly for use in parking-assist sensors and systems.

16 Claims, 3 Drawing Sheets

(56) References Cited

U.S. PATENT DOCUMENTS

2014/0147154 A1\* 5/2014 Arai .................. G03G 15/50
                                                    399/75
2014/0300504 A1   10/2014 Shaffer et al.
2016/0313438 A1\* 10/2016 Hallek ............... G01S 15/931

\* cited by examiner

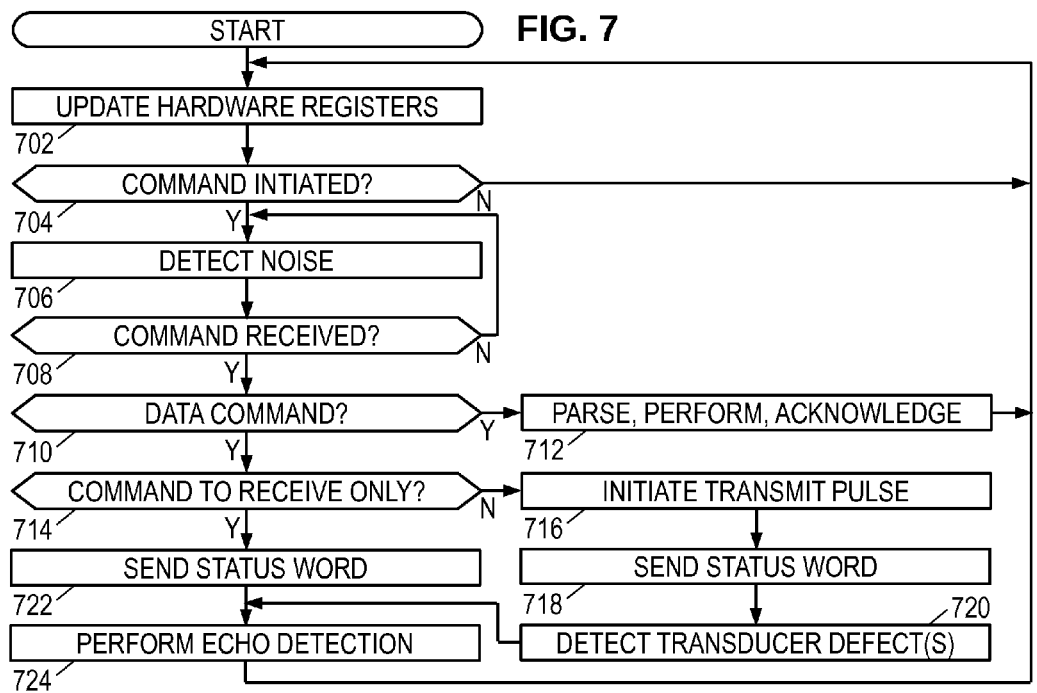

TRIGGERED-EVENT SIGNALING WITH DIGITAL ERROR REPORTING

BACKGROUND

Modern automobiles are equipped with an impressive number and variety of sensors. The sheer number of sensors makes it desirable to minimize the wiring requirements of each sensor, subject to constraints on cost and reliability. Certain efforts in this direction have relegated error reporting to a secondary status, requiring the control unit to employ subsidiary modes to detect and report sensor errors. Such subsidiary modes generally require additional complexity as well as time that may not be available during many maneuvers.

For example, a parking-assist system may employ ultrasonic transducers or other parking-assist sensors ("PAS") to monitor the distance between the vehicle and any obstacles in and around a selected parking spot. Due to environmental "noise" and safety concerns, the sensors may be asked to provide tens of measurements each second as the vehicle approaches and enters the confined area. With each measurement requiring roughly 20 milliseconds and each of the multiple transducers needing to be actuated in turn while the other transducers listen, at least some contemplated parking-assist systems will be unable to spare any time to switch to a subsidiary mode and query the status of the various sensors.

SUMMARY

Accordingly, there are disclosed herein various sensors, sensor controllers, and sensor control methods with digital error reporting via a one-line triggered-event signal. One illustrative sensor embodiment includes: a transducer that produces a sensor signal; an event signaling line; and a controller that detects a trigger signal on the event signaling line and responsively provides at least one status bit on the event signaling line before driving the event signaling line based on the sensor signal. An illustrative sensor controller includes: a transmitter that drives an ultrasonic transducer to produce a transmit pulse; a receiver that derives a sensor signal from the transducer; and a core logic that detects a trigger signal on an event signaling line and responsively provides one or more error reporting bits on the event signaling line before driving the event signaling line based on the sensor signal. An illustrative sensor control method includes: detecting a trigger signal on an event signaling line; providing at least one status bit on the event signaling line in response to the trigger signal; and after providing the at least one status bit, driving the event signaling line based upon on a sensor signal from a transducer. The transducer may be a piezoelectric element for producing and sensing ultrasonic pulses.

BRIEF DESCRIPTION OF THE DRAWINGS

In the drawings:

FIG. 7 is a flow diagram for an illustrative sensor control method.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
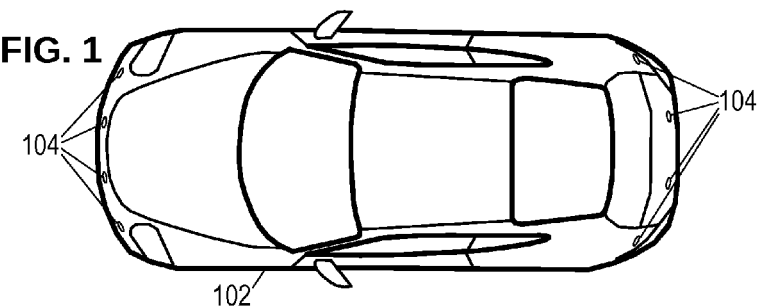
FIG. 1 is an overhead view of an illustrative vehicle equipped with parking-assist sensors.

FIG. 1 shows an illustrative vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to obstacles in the various detection zones, using the sensors for individual measurements as well as cooperative (e.g., triangulation) measurements.

The ultrasonic sensors are transceivers, meaning that each sensor can transmit and receive pulses of ultrasonic sound. Emitted pulses propagate outward from the vehicle until they encounter and reflect from an object or some other form of acoustic impedance mismatch. The reflected pulses return to the vehicle as "echoes" of the emitted pulses. The times between the emitted pulses and received echoes are indicative of the distances to the reflection points. Preferably, only one sensor transmits at a time, though all of the sensors may be configured to measure the resulting echoes.

Figure 2:
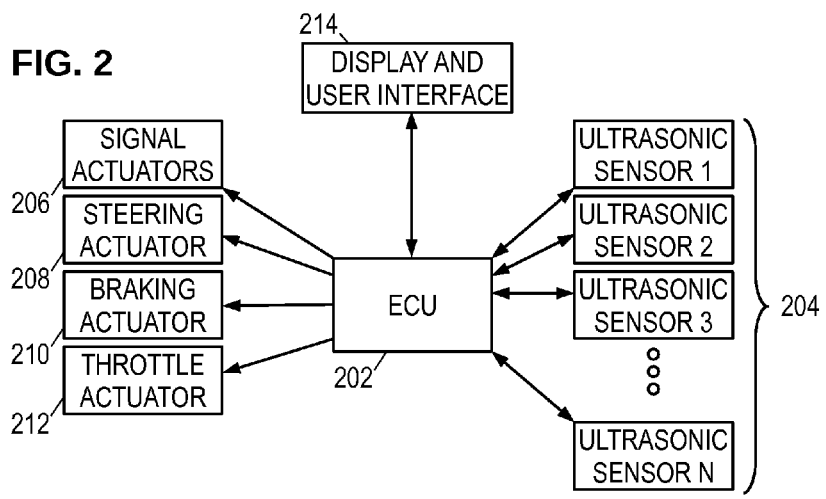
FIG. 2 is a block diagram of an illustrative parking assist system.

FIG. 2 shows an electronic control unit (ECU) 202 coupled to the various ultrasonic sensors 204 as the center of a star topology. To provide automated parking assistance, the ECU 202 may further connect to a set of actuators such as a turn-signal actuator 206, a steering actuator 208, a braking actuator 210, and throttle actuator 212. ECU 202 may further coupled to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

Figure 3:
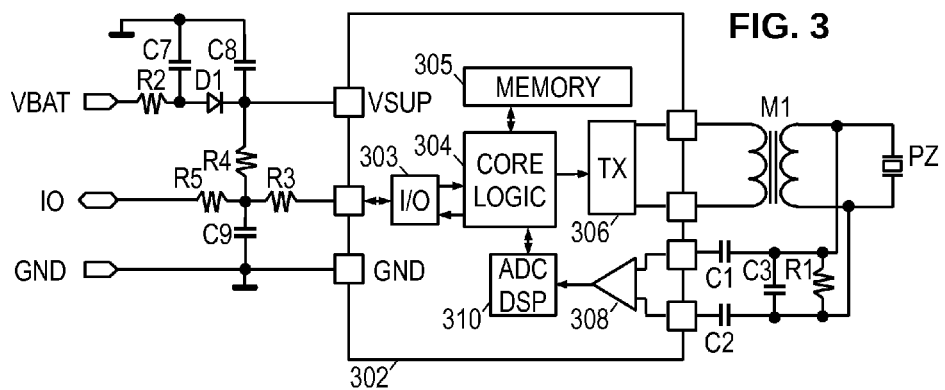
FIG. 3 is a circuit schematic of an illustrative parking-assist sensor.

As indicated in FIG. 3, besides the two power terminals (Vbat and GND), each of the illustrative ultrasonic sensors is only connected to the ECU 202 by a single input/output ("I/O" or "IO") line. The sensor's ground terminal (GND) is shown as being directly connected to the ground terminal of an application-specific integrated circuit (ASIC) sensor controller 302, while the Vbat terminal is coupled through an RC filter (resistor R2 and capacitor C7) and a diode-fed (D1) storage capacitor C8 to a supply voltage (VSUP) terminal of the sensor controller 302. The RC filter blocks any high-frequency noise, while the storage capacitor protects against transient power loss.

The sensor's IO terminal is coupled via a slew rate-limiting noise filter (resistors R3 and R5, with capacitor C9) to an I/O terminal of the sensor controller 302. A pull-up resistor R4 biases the I/O line to the supply voltage (the "de-asserted" state) when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU and carry out the appropriate operations, including the transmission and reception of ultrasonic pulses. To transmit an ultrasonic pulse, the core logic 304 is coupled to a transmitter 306 which drives a pair of transmit terminals on the sensor controller 302. The transmitter terminals are coupled via a transformer M1 to a piezoelectric transducer PZ. The transformer M1 steps up the voltage from the sensor controller (e.g., 12 volts) to a suitable level for driving the piezoelectric transducer (e.g., hundreds of volts). The piezoelectric transducer PZ has a resonance frequency that is tuned to a desirable value (e.g., 48 kHz) with a parallel capacitor C3 and a resonance quality factor (Q) that is tuned with a parallel resistor R1.

A pair of DC-isolation capacitors C1, C2 couple the piezoelectric transducer to the sensor controller's pair of receive terminals to protect against high voltages. Further protection is provided with internal voltage clamps on the receive terminals. Such protection is needed for the intervals when the piezoelectric transducer is transmitting. However, the received echo signals are typically in the millivolt or microvolt range, and accordingly, a low-noise amplifier 308 amplifies the signal from the receive terminals. The amplified receive signal is digitized and processed by a digital signal processor (DSP) 310 with an integrated analog-to-digital converter (ADC).

DSP 310 applies programmable methods to measure the actuation period of the transducer during the transmission of a pulse (including the ensuing reverberation or "ringing" period), and to detect and measure the lengths of any received pulses or "echoes". Such methods may employ threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and decay rate, and may further detect error conditions such as an excessively short actuation period (which may be due to a disconnected or defective transducer, suppressed vibration, or the like) or an excessively long actuation period (defective mounting, inadequate damping resistance, or the like).

Commands received via the I/O line trigger the core logic 304 to operate the transmitter and receiver and provide the measurement results to the ECU 202 via the I/O line, as explained further below. In addition to the error conditions that may be detected by the DSP 310, the core logic may monitor other error conditions such as having the supply voltage "under-voltage" or "over-voltage" while transmitting an ultrasonic pulse, thermal shutdown of transmitter, a hardware error, an incomplete power-on reset, or the like. Any error conditions may be noted and stored in internal registers or nonvolatile memory 305.

Figure 4:
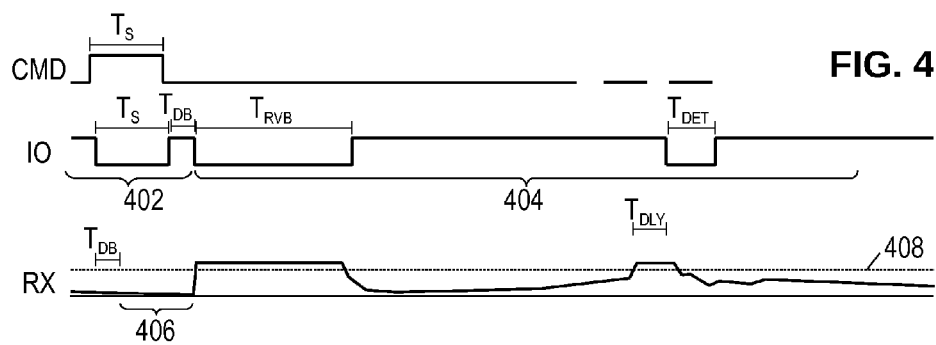
FIG. 4 is an illustrative signal timing diagram.

FIG. 4 is a diagram showing an illustrative signal timing that may be employed for communication on the I/O line. The ECU formulates a signal pulse "CMD" having a duration that represents a desired command, in this instance "$T_S$" to represent a "send and receive" command. (Illustrative command pulse durations may be in the 300-1300 microsecond range.) During a time 402 when the sensor is inactive (i.e., not performing a measurement or otherwise responding to a command from the ECU), the I/O line is high (de-asserted). The ECU asserts the IO signal by actively driving the line low for the duration representing the command. There is a small propagation delay due to limited slew rates on the I/O line, and a debounce interval ("$T_{DB}$") follows the assertion to ensure that the timing of line's return to battery voltage is deliberate and not a result of transient noise. (Illustrative debounce intervals may be in the 40-80 microsecond range.)

With the lapse of the debounce interval, the sensor controller takes control of the I/O line for a programmed measurement interval 404. Before discussing the operation of the I/O line during the measurement interval, we consider the amplified receive signal RX. For discussion purposes, FIG. 4 actually shows an envelope of the RX signal; in practice the RX signal is oscillatory.

The sensor controller measures a noise level during a pre-transmit period 406, which begins one debounce interval after the ECU asserts the I/O line and ends when the transmit pulse is sent. The actuation of the transducer for the transmit pulse causes the RX signal to saturate. The transmit pulse overwhelms the receiver and prevents any meaningful echo measurements from being acquired during this interval. While the receive signal is above a threshold 408 (and/or compliant with other implementation-specific requirements that aren't relevant here), the sensor controller drives the I/O line low. This assertion during the transmit pulse enables the ECU to measure the reverberation period ("$T_{RVB}$") of the transducer, enabling it to verify operation of the transducer.

Once the receive signal falls below a threshold 408, it becomes possible to detect echoes, and the I/O line is de-asserted until such time as the sensor controller detects a valid echo. The requirements for a valid echo may include, e.g., a minimum time ("$T_{DLY}$") above a threshold 408, the minimum time being equal to or greater than the debounce interval $T_{DB}$. Such a requirement necessarily requires that the assertion of the I/O line in response to an echo be delayed by the minimum time $T_{DLY}$. The assertion lasts for a duration ("$T_{DET}$")equal to the detected length of the echo pulse. In at least some embodiments, multiple echoes may be detected and represented by respective assertions of the I/O line. At the end of the programmed measurement interval 404, the sensor controller 302 releases control of the I/O line.

With the foregoing protocol, it is possible for the ECU to detect certain sensor error conditions during measurements, but not other sensor error conditions. Errors such as excessive noise, under/over-voltage conditions, and the like, can only be detected if the ECU halts the measurement sequence and takes the time to send a "data" command to probe the appropriate registers of the sensor controller. Without such probing, the ECU may inadvertently rely on unreliable measurements, yet with such probing the measurement repetition rate may become inadequate.

Figure 5A:
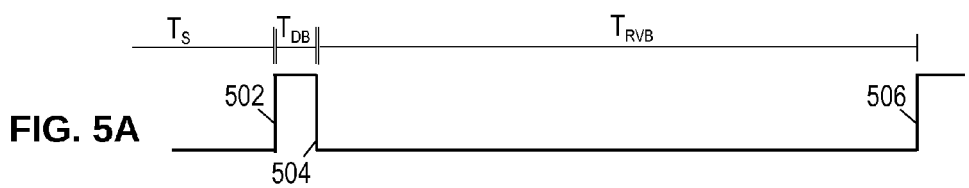
FIGS. 5A-5B are "send and receive" timing specifications for an illustrative event signaling line.

Accordingly, certain changes to the protocol are proposed herein. FIG. 5A shows an enlarged view of the I/O line signal at the end of a transmitted "send and receive" command from the ECU, marked by rising edge 502. In the foregoing protocol, the transmit pulse is initiated and the drives the I/O line signal low (falling edge 504) one debounce interval $T_{DB}$ after the rising edge 502. Rising edge 506 then marks the end of the reverberation period measurement and the beginning of the echo detection interval. However, we note that the timing of falling edge 504 is fixed in the foregoing protocol and conveys no useful information.

The communication of useful information only begins with rising edge 506, usually around 400-700 microseconds later.

Figure 5B:
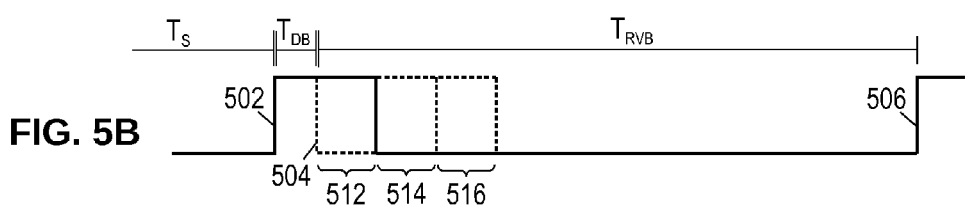

Conversely, the protocol represented in FIG. 5B employs the initial portion of this reverberation period to convey digital information to the ECU. The lapsing of one debounce interval $T_{DB}$ still coincides with the initiation of the transmit pulse, but is not necessarily marked by a falling edge 504. The sensor controller defines a number of bit intervals 512-516 (three are shown, but this is not a limitation) immediately following the initiation of the transmit pulse, each lasting at least one debounce interval $T_{DB}$, but preferably longer (e.g., 20-50% longer) to provide added noise immunity. Alternatively, the minimum interval may be used and one or more additional bit intervals may be added to provide error detection or error correction. As the sensor controller asserts the I/O line signal after the bit intervals, at least one falling edge occurs immediately before, during, or immediately after the bit intervals. To the extent that propagation delay is significant, the ECU may derive it from the timing of this falling edge. Otherwise, the ECU simply accounts for the bit intervals when measuring the length of the reverberation period.

In one contemplated embodiment, assertion during the first bit interval 512 indicates an excessive noise level during the pre-transmit period 406, assertion during the second bit interval 514 indicates is asserted to indicate an acceptable reverberation period (of the preceding transmit pulse, as the measurement of the current reverberation period is not yet complete), and the third bit interval is asserted to indicate an absence any other errors (such as under/over voltage, thermal shutdown, a hardware error, power-on reset, etc.) Thus, during a successful, error-free, measurement, the I/O signal would be high during the first bit interval and low during the second and third bit intervals. However, when an error is detected, the ECU is promptly alerted to the presence of the error without any reduction in the maximum measurement repetition rate.

Figure 6A:
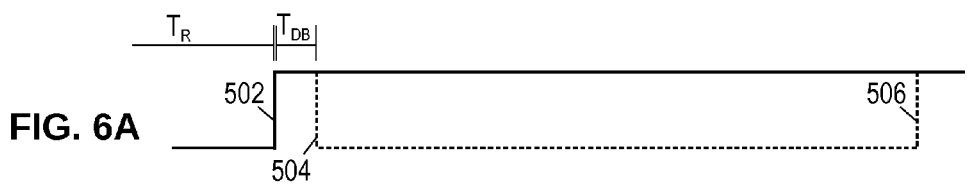
FIGS. 6A-6B are "receiving only" timing specifications for an illustrative event signaling line.
Figure 6B:
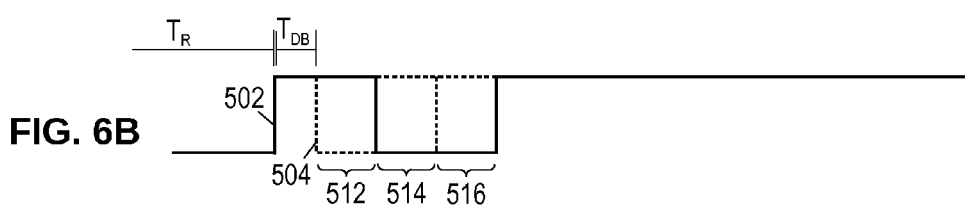

The bit intervals are preferably also provided during the "receive only" measurements. In the unmodified protocol, FIG. 6A shows a view of the I/O line signal at the end of a transmitted "receive only" command from the ECU, marked by the rising edge 502. The reverberation interval that would occur during a transmitted pulse is indicated as a dashed line with falling edge 504 and rising edge 506. The sensor specifications do not contemplate any echo detection during this interval, and accordingly it represents a time period during which no useful information is conveyed. Accordingly, the modified protocol shown in FIG. 6B provides the foregoing bit intervals 512-516 during this interval, thereby reporting any errors without in any way reducing the maximum measurement repetition rate.

FIG. 7 is a flow diagram for an illustrative sensor control method. It begins in block 702 with the control logic updating registers to indicate any detected errors. These registers are reset when read by the ECU. In block 704, the control logic determines whether the ECU has asserted the I/O line to initiate a command. If not, blocks 702 and 704 are repeated while the control logic awaits a command.

Upon detecting the initiation of a command, the control logic prompts the receiver to perform noise level detection in block 706. In block 708, the control logic determines if the command has been fully received. If not, block 704 and 706 are repeated while the control logic awaits completion of the command.

Once the command has been fully received, the control logic determines in block 710 it is a "data" command. If so, the control logic 712 parses the digital data to determine what the command is and to carry it out. For example, the command may indicate that a certain value is to be written to a specified memory address, or that the contents of a specified register are to be sent to the ECU. The control logic carries out the command and signals its completion to the ECU. Once the data operations have been completed, the control logic returns to block 702.

If the command is not a data command, the control logic determines in block 714 if it is a "receive only" command. If not, then in block 716, the control logic triggers the transmitter to send a transmit pulse, and in block 718 sends a digital status word (consisting of one or more bit intervals) to the ECU. As described previously, the digital status word is derived from a noise level measurement and any error conditions that may be stored in the hardware registers. Among such conditions are an excessively long or short reverberation period as measured by the DSP in block 720. Thereafter, the DSP performs echo detection in block 724 and drives the I/O line accordingly. Once the measurement period elapses, the sensor controller returns to block 702.

If the control logic determines in block 714 that the command is a "receive only" command, it sends the digital status word to the ECU upon completion of the command (after the debounce interval has lapsed) in block 722. Thereafter, the DSP performs echo detection in block 724 and, once the measurement period elapses, the sensor controller returns to block 702.

Though the operations shown and described in FIG. 7 are treated as being sequential for explanatory purposes, in practice the method may be carried out by multiple integrated circuit components operating concurrently and speculatively. The sequential discussion is not meant to be limiting. Moreover, the foregoing embodiments may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any sensors providing triggered event, one-line signaling with a dead time after the trigger signal. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A sensor that comprises:
   a transducer that produces a sensor signal;
   a single I/O line; and
   a controller that monitors the single I/O line in a recessive mode and, upon detecting a trigger signal responsively enters a dominant mode to drive the single I/O line with a pulse having a pulse duration equal to a detected duration of an echo pulse in the sensor signal, wherein immediately upon entering the dominant mode and prior to driving the single I/O line with said pulse, the controller provides at least one status bit on the single I/O line to indicate whether a noise level of the sensor signal exceeds a threshold.

2. The sensor of claim 1, wherein the controller further drives the transducer to produce a transmit pulse in response to the trigger signal, wherein said at least one status bit is provided during production of the transmit pulse.

3. The sensor of claim 2, wherein the controller monitors a resonance frequency or decay rate of the transducer and wherein said at least one status bit further indicates whether the resonance frequency or decay rate is satisfactory.

4. The sensor of claim 1, wherein the controller monitors multiple potential error conditions and wherein the at least one status bit is one of multiple status bits provided on the single I/O line that collectively indicate an absence of said error conditions or identify at least one of said error conditions.

5. The sensor of claim 1, wherein the transducer is an ultrasonic transducer.

6. A sensor control method that comprises:
detecting a trigger signal on a single I/O line;
providing at least one status bit on the single I/O line in response to the trigger signal to indicate whether a noise level of a sensor signal from a transducer exceeds a threshold; and
after providing the at least one status bit, driving the single I/O line with a pulse having a pulse duration equal to a detected duration of an echo pulse in the sensor signal.

7. The method of claim 6, further comprising:
sending a transmit pulse with the transducer,
wherein said providing at least one status bit occurs during said sending.

8. The method of claim 7, further comprising:
monitoring a resonance frequency or decay rate of the transducer,
wherein said at least one status bit further indicates whether the resonance frequency or decay rate is satisfactory.

9. The method of claim 6, further comprising: monitoring multiple potential error conditions, wherein the at least one status bit is one of multiple status bits provided on the single I/O line that collectively indicate an absence of said error conditions or identify at least one of said error conditions.

10. The method of claim 6, wherein the transducer is an ultrasonic transducer.

11. A sensor controller that comprises:
a transmitter that drives an ultrasonic transducer to produce a transmit pulse;
a receiver that derives a sensor signal from the transducer; and
a core logic that detects a trigger signal on a single I/O line and responsively provides one or more error reporting bits on the single I/O line before driving the single I/O line with a pulse having a pulse duration equal to a detected duration of an echo pulse in the sensor signal, wherein the one or more reporting bits indicate at least whether a noise level in the sensor signal exceeds a threshold.

12. The controller of claim 11, wherein the core logic further operates the transmitter to produce the transmit pulse in response to the trigger signal, wherein the one or more error reporting bits are provided during production of the transmit pulse.

13. The controller of claim 12, wherein the core logic monitors a reverberation time of the transducer and wherein the one or more error reporting bits further indicate whether the reverberation time is within limits.

14. The controller of claim 11, wherein the core logic monitors multiple potential error conditions, and wherein the one or more status bits indicate an absence or existence of each said error condition.

15. A sensor controller that comprises:
a transmitter that drives an ultrasonic transducer to produce a transmit pulse;
a receiver that derives a sensor signal from the transducer; and
a core logic that detects a trigger signal on a single I/O line and responsively provides one or more error reporting bits on the single I/O line before driving the single I/O line with a pulse having a pulse duration corresponding to a detected duration of a pulse in the sensor signal, wherein the one or more error reporting bits indicate at least whether the reverberation time is within limits.

16. The controller of claim 15, wherein the core logic further operates the transmitter to produce the transmit pulse in response to the trigger signal, wherein the one or more error reporting bits are provided during production of the transmit pulse.

* * * * *